United States Patent [19]
Ferrieu

[11] Patent Number: 4,481,463
[45] Date of Patent: Nov. 6, 1984

[54] CURRENT MIRROR CIRCUIT

[75] Inventor: Gilbert M. M. Ferrieu, Bievres, France

[73] Assignee: U.S. Philips Corporation, New York, N.Y.

[21] Appl. No.: 374,123

[22] Filed: May 3, 1982

Related U.S. Application Data

[63] Continuation-in-part of Ser. No. 159,732, Jun. 16, 1980, Pat. No. 4,356,354.

[30] Foreign Application Priority Data

Jun. 25, 1979 [FR] France .................. 79 16261

[51] Int. Cl.³ .............................................. G05F 3/08
[52] U.S. Cl. .............................. 323/315; 179/18 FA; 179/70; 179/77
[58] Field of Search ............. 179/18 FA, 70, 77; 323/312, 315, 316; 330/288

[56] References Cited

U.S. PATENT DOCUMENTS

| | | | |
|---|---|---|---|
| 3,588,672 | 6/1971 | Wilson | 323/315 |
| 3,911,353 | 10/1975 | van de Plassche | 323/315 |
| 4,317,082 | 2/1982 | Gross | 330/288 |

Primary Examiner—William H. Beha, Jr.
Attorney, Agent, or Firm—Thomas A. Briody; William J. Streeter

[57] ABSTRACT

A current mirror circuit for weighting a plurality of input currents and for forming their sum, the weighting coefficients of the input currents each being determined by the ratio between the value of first resistors present between an input terminal and a power supply terminal, and the value of a second resistor. Such circuits are suitable for use in subscriber line interface circuits in which the weighted sum is to be formed of the currents entering and leaving the subscriber's line with a precise adjustment of the weighting coefficients.

8 Claims, 3 Drawing Figures

CURRENT MIRROR CIRCUIT

This is a continuation-in-part of U.S. application Ser. No. 159,732, filed June 16, 1980, now U.S. Pat. No. 4,356,354.

The invention relates to a current mirror circuit for weighting an input current with a specific coefficient and, in general, to a circuit for weighting input currents with specific coefficients and for forming the sum of said weighted input currents.

Such circuits may for example be used in a subscriber line interface circuit in which a current is to be formed which is the weighted sum of the currents entering the subscriber's line and leaving the subscriber's line.

DESCRIPTION OF THE PRIOR ART

A circuit for forming an output current by weighting an input current with a specific coefficient is frequently called a current mirror. Known current mirrors (for example the Wilson circuit described in U.S. Pat. No. 3,588,672) are frequently constituted by a circuit comprising two transistors with commoned emitters and commoned bases, one of said transistors having its collector connected to its base in order to function as its base-emitter diode. In this circuit, the ratio between the collector currents of the two transistors, that is, the weighting coefficient of one of the currents, depends almost solely on the characteristics of the base-emitter diodes of the two transistors; when these two transistors are integrated on one semiconductor body, said current ratio depends almost solely on the ratio of the emitter areas of the transistors for one specific value of one of the currents.

In certain cases current mirrors may be required which are easy to adjust in order to obtain well-defined and accurate current ratios. It may also be required to have current mirrors with substantially equal current ratios. However, it will be evident to those skilled in the art that the known current mirrors cannot be constructed so that accurate current ratios can be obtained or so that said ratios can be adjusted. On the other hand, said known current mirrors also have the drawback that the current range in which the current ratio remains substantially constant is rather limited. Therefore, the known current mirrors are not suitable for uses where accurate current ratios are required, which are adjustable over a wide current range.

Problems of an accurate weighting of currents, which are adjustable over a wide current range occur, for example, in a line interface circuit described in the Applicant's French Patent Application No. 78 18 960, filed on June 26, 1978, and in the Certificate of Addition filed under No. 78 27 762 on Sept. 28, 1978 which were combined and filed as U.S. patent application Ser. No. 51,084, filed June 22, 1979, now U.S. Pat. No. 4,275,277, issued June 23, 1981. An interface circuit of this type comprises a push-pull power amplifier comprising two power supply terminals, to be connected to two terminals of a d.c. power supply source, and two output terminals, to be connected to the two ends of the subscriber's line, which interface circuit moreover comprises means for forming a current representing the weighted sum of the currents entering the subscriber's line and leaving the subscriber's line with substantially equal weighting coefficients, and phase-shifting and switching means, for the formation of two voltages which are in phase and in phase opposition with the voltage across a load impedance through which said weighted-sum current flows and for the negative feedback of said two voltages to the two input terminals of the amplifier.

As is known, a subscriber line interface circuit is a device which is adapted to connect each subscriber's line to a telephone exchange, for which purpose it should perform a certain number of functions including the supply of direct current to the subscriber's line with, in one direction or the other, the transmission of the speech signals between the subscriber's line and the telephone exchange, and finally the transmission of metering signals to the subscriber. In order to realise these functions a certain number of requirements should be met, such as a current in the subscriber's line which cannot vary over a wide range, a minimal transmission bridge resistance (for example 300 ohms) which is balanced relative to each power-supply terminal, a specified impedance of said interface circuit to speech currents (for example 600 ohms) which is perfectly balanced relative to earth, and a high efficiency as regards the transmission of the speech signals.

In order to maintain the symmetry of the transmission bridge resistance and of the impedance for speech currents in the interface circuit of the said type it is very important that the current entering the subscriber's line and the current leaving the subscriber's line occur with substantially equal weight in the weighted-sum current. On the other hand, in order to ensure that said resistance and impedance have the specified values, it is useful to have a simple means for adjusting the weighted-sum current while maintaining equal weighting coefficients. Finally, the values of said weighting coefficients should be independent of the current in the subscriber's line, which may assume a wide range of different values. These requirements cannot readily be met if conventional current mirrors are employed for the formation of the weighted sum current from the currents entering the subscriber's line and leaving the subscriber's line.

It is an object of the present invention to provide a circuit for weighting an input current and, in general, a circuit for weighting input currents and forming the sum of said currents, with accurately adjustable coefficients enabling said coefficients to be adjusted to specific values, said weighting coefficients being moreover independent of the input currents.

SUMMARY OF THE INVENTION

For weighting an input current with a specific coefficient, a circuit in accordance with the invention comprises a first transistor whose emitter is coupled to a power-supply terminal via a first resistor, of which one end is connected to the input terminal of said circuit and of which the other end is connected to said power supply terminal, the collector of said first transistor being energized by a current source and its base being connected to a current source and to a diode which is connected to the emitter of a single or composite second transistor, whose emitter is connected to said power supply terminal via a second resistor, whose base is connected to the collector of the first transistor, and whose collector is connected to the output terminal of said circuit, the weighting coefficient of the input current being defined by the ratio between the values of the first and the second resistor.

Such a circuit, which functions as a current mirror, has the advantage that the ratio between the output and input currents or the weighting coefficient of the input current depends only on the ratio between two resistor values and does not depend on the characteristics of the semiconductors of the circuit. Said ratio can readily be adjusted with the required accuracy.

For weighting a plurality of input currents with specific coefficients and for forming the sum of said weighted input currents, a circuit in accordance with the invention comprises a first transistor, whose emitter is coupled to a power supply terminal via first resistors connected in series, one end of each of said resistors being connected to an input terminal of said circuit and receiving an input current, whose collector is energized by a current source, and whose base is connected to a current source and to a diode connected to the emitter of a single or composite second transistor, whose emitter is connected to said power supply terminal via a second resistor, whose base is connected to the collector of the first transistor, and whose collector is connected to the output terminal of said circuit, the weighting coefficients of the input currents each being determined by the ratio between the values of the first resistors present between one input terminal and the power-supply terminal and the value of the second resistor.

This circuit has the same advantages as the preceding circuit as regards the ease of adjustment of the weighting coefficients and the independence of the semiconductor characteristics.

In order to form the sum of a first current and a second current which are weighted with the same weighting coefficient, it may be interesting to employ a circuit arrangement comprising a circuit for forming the sum of the two weighted input currents in accordance with the invention, provided with two first resistors in series between the emitter of said first transistor and said power supply terminal, the emitter of said first transistor being connected to a first input terminal and the common point of said first resistors being connected to a second input terminal, the first input terminal being connected to the output of a circuit in accordance with the invention, which weights the first current with a coefficient k, and the second input terminal receiving the second current, the ratio between the value of the first resistor, which is connected to the power supply terminal and the sum of the values of said two first resistors being adjusted so as to be equal to said coefficient k, said circuit for forming the sum of the two weighted currents supplying the desired sum current in which the weighting coefficient which is common to the first current and to the second current is determined by the ratio between the value of the first resistor, which is connected to the supply terminal, and that of said second resistor.

Embodiments of the invention will now be described in more detail by way of example with reference to the accompanying drawing.

BRIEF DESCRIPTION OF THE DRAWING

FIG. 1 shows a device comprising two circuits in accordance with the invention. The circuit 19 in the lower part of the Figure is a circuit functioning as a current mirror, which is adapted to weight an input current with a coefficient and the circuit 16 in the upper part of the Figure is adapted to weight a plurality of input currents with coefficients and to form the sum of said weighted input currents. First of all each of the circuits 19 and 16 will be described, which circuits may be used separately, and subsequently their embodiment shown in FIG. 1 will be described, which may for example be used in the subscriber's line interface circuit whose diagram is shown in FIG. 2.

Figure 1:
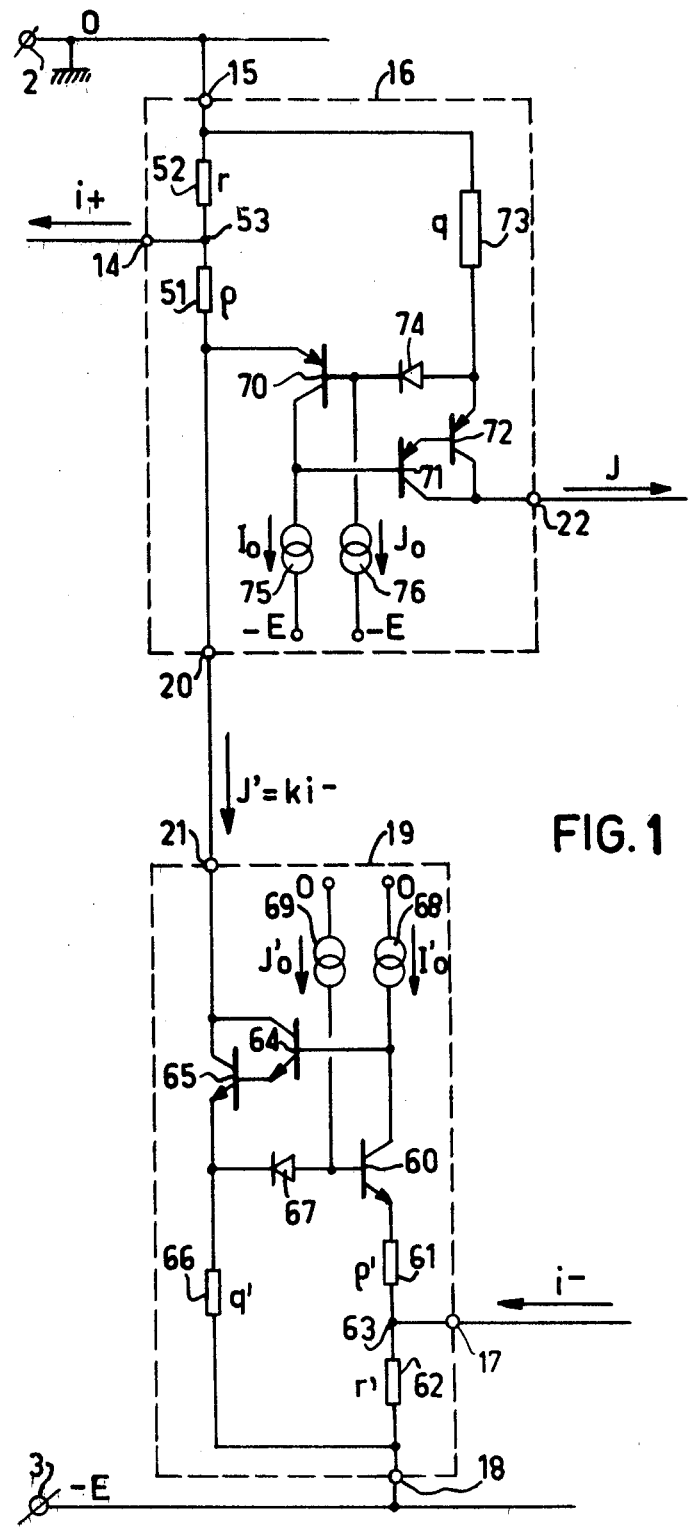
FIG. 1 shows an arrangement of two current-weighting circuits in accordance with the invention.

The circuit 19, which functions as a current mirror, comprises an input terminal 17 on which the input current $i^-$ appears and a power supply terminal 18, which is connected to the negative terminal 3 of a d.c. power-supply source, which terminal 3 is at the potential $-E$. The positive terminal 2 of said power supply source is at zero or earth potential. Said circuit 19 should produce an output current $J' = ki^-$ at its output terminal 21 which current is the result of weighting the current $i^-$ with a weighting coefficient k smaller than or equal to 1. The input and output currents $i^-$ and $J'$ have the same directions relative to the input and output terminals 17 and 21.

The circuit 19 is constituted by a first npn transistor 60 whose emitter is connected to the power supply terminal 18 via the series-connected resistors 61 and 62 of the value $p'$ and $r'$ respectively, the end 63 of the resistor 62 being connected to the input terminal 17 and its other end being connected to the power supply terminal 18. The collector of the transistor 60 is connected to one terminal of a current source 68 which supplies a current $I'_o$. The base of transistor 60 is connected to a terminal of a current source 69 which supplies a current $J'_o$. The other terminals of the current sources 68 and 69 are at zero potential. The base of the transistor 60 is also connected to the emitter of an npn transistor 65 via a diode 67. Transistors 65 and another npn transistor 64 and are connected in a Darlington configuration in order to form a composite high-gain transistor. The emitter of said composite transistor 64–65, which is the emitter of the transistor 65, is connected to the power supply terminal 18 via a resistor 66 of the value $q'$. The base of the composite transistor, which is the base of the transistor 64, is connected to the collector of the transistor 60. Finally, the commoned collectors of said two transistors 64 and 65 are connected to the output terminal 21 of the circuit 19.

The operation of said circuit 19 may be described as follows. When ignoring the base currents of the transistor 60 and the transistor 64, allowance being made for the indicated current directions, it will be seen that the current $I'_o$ flows through the resistor $p'$ and the current $I'_o + i^-$ through the resistor $r'$. Applying the same approximation, it will also be appreciated that a current $J' + J'_o$ flows through the resistor $q'$. Since the voltage drops across the diode 67 and the base-emitter diode of the transistor 60 are substantially equal, the voltages on the emitters of the transistors 60 and 65 will be substantially equal, which may be represented by the relationship:

$$p'I'_o + r'(I'_o + i^-) = q'(J' + J'_o)$$

or $$J' = (r'/q')i^- + [I'o\,(r'+p')/q' - J'o]$$

The currents I'o and J'o supplied by the current sources 68 and 69 are small bias currents (of the order of some tens of μA) and may be equal to each other. In the above expression for J' the term in brackets, which represents the difference, is very small and may be eliminated completely if desired. For example, if $I'_o = J'_o$, said difference term is eliminated if $r' + p' = q'$. This yields:

$$J' = (r'/q')i^- \qquad (1)$$

The circuit 19 behaves as a current mirror supplying an output current J', which is the result of weighting the input current $i^-$ with a coefficient $k = r'/q'$ which depends only on the ratio of the values of the two resistors r' and q'. The weighting coefficient k is independent of the characteristics of the transistors and diodes of the circuit and is consequently independent of the input current $i^-$. It can easily be adjusted with the desired accuracy by adjusting a resistance value, for example, that of the resistor q', without the difference term in brackets in the expression for J' departing substantially from zero.

The circuit 16 for weighting the input currents and forming the sum of said weighted input current greatly resembles the circuit 19. Said circuit 16 comprises a power supply terminal 15 which is connected to the positive terminal 2 of the power supply source. In the example shown, the circuit 16 receives two input currents, an input current $i^+$ appearing on its input terminal 14 and an input current J' appearing on its input terminal 20, which for the moment is assumed to be disconnected from the current mirror circuit 19. The function of the circuit 16 is to provide an output current J on its output terminal 22 which current is the result of weighting the input currents $i^+$ and J' with weighting coefficients which are smaller than or equal to 1. The input currents $i^+$, J' and the output current J have the same direction relative to the terminal 14, 20 and 22.

The circuit 16 is constituted by a first pnp transistor 70, whose emitter is connected to the power supply terminal 15 via the series resistors 51 and 52 of the value p and r respectively. The end of the resistor 51 which is connected to the emitter of the transistor 70 is connected to the input terminal 20. The terminal 53 which is common to the resistors 51 and 52 is connected to the input terminal 14. The collector of the transistor 70 is connected to one terminal of a current source 75 which supplies a current $I_o$. The base of the transistor 70 is connected to a terminal of a current source 76 which supplies a current Jo. The other terminals of the current sources 75 and 76 are at the potential $-E$. The base of the transistor 70 is also connected to the emitter of a transistor 72 via a diode 74. Transistor 72 and another pnp transistor 71 are arranged in a Darlington configuration in order to form a composite high-gain transistor. The emitter of said composite transistor 71-72, which is the emitter of transistor 72, is connected to power supply terminal 15 via a resistor 73 of the value q. The base of the composite transistor, which is the base of the transistor 71, is connected to the collector of the transistor 70. Finally, the commoned collectors of the two transistors 71 and 72 are connected to the output terminal 22 of the circuit 16.

The operation of said circuit 16 may be described as follows. When ignoring the base currents of the transistor 70 and 71, it will be appreciated that the current $J' + I_o$ flows through the resistor 51 having a value p, the current $J' + I_o + i^+$ through the resistor 52 having a value r, and finally the current $J + J_o$ through the resistor 73 having a value q. The voltage drops across the diode 74 and the base emitter diode of the transistor 70 are substantially equal to each other in such a way that the voltages on the emitters of the transistors 70 and 72 are substantially equal. This yields the relationship:

$$p(J' + Io) + r(J + Io + i^+) = q(J + Jo)$$

or $$J = (r/q)i^+ + (r+p/q)J' + [Io(r+p/q) - Jo]$$

The currents Io and Jo are small bias currents and the difference term in brackets in the expression for J is very small and may be eliminated completely if desired. This would yield:

$$J = (r/q)i^+ + (r + p/q)J' \qquad (2)$$

By means of the circuit 16 the input currents $i^+$ and J' can be weighted with the respective weighting coefficients r/q and (r+p)/q and the output current J can be formed, which is the sum of said weighted input currents. The weighting coefficients do not depend on the characteristics of the transistors and diodes of the circuit and can be adjusted by adjusting the values of the resistors.

It will be noted that in the expression for the output current J in accordance with formula (2) the two input currents $i^+$ and J' of the circuit 16 are weighted with different weighting coefficients. If it is desired to weight two currents with the same weighting coefficients and to form the sum of said weighted currents, it is advantageous to add a current mirror circuit to the circuit 16. It is particularly advantageous to add the current mirror circuit 19 to the circuit 16 as is shown in FIG. 1. It can be seen in said Figure that the output 21 of the circuit 19 is connected to the input 20 of the circuit 16. The case is considered that one of the currents to be weighted is the current $i^-$ applied to the input 17 of the current mirror circuit 19 and that the other current to be weighted is the current $i^+$ applied to the input 14 of the circuit 16. Since the circuit 19 weights the current $i^-$ with a coefficient k, the current J' applied to the input 20 of the circuit 16 will be $J' = ki^-$. The current J supplied by the circuit 16 may therefore be written as follows in accordance with formula (2):

$$J = (r/q)i^+ + (r+p/q)ki^-$$

If in the circuit 16 the values of resistors 52 and 51 are adjusted in such a way that:

$$r/r + p = k,$$

this yields:

$$J = r/q(i^+ + i^-) \qquad (3)$$

By adjusting the values of the resistors 52 and 51 in such a way that $r/(r+p) = k$, the currents $i^+$ and $i^-$ are weighted with the same weighting coefficient r/q in the output current J of the circuit 16. By subsequently adjusting the value of the resistor q, said weighting coefficient can be changed. That is, the amplitude of the output current J can be changed without affecting the equality requirement for the weighting coefficients. In the combination of FIG. 1, the circuit 19 may, of course, also be replaced by a known current mirror circuit, but this would not yield the same advantages.

The circuits 16 and 19 described with reference to FIG. 1 are respectively formed by means of pnp and npn transistors and are energized by voltages of corresponding polarity. It is evident that they could also be formed by means of transistors of opposite conductivity types and with supply voltages of opposite polarities.

The current weighting circuits in accordance with the invention which have been described are particularly suitable for use in a subscriber line interface circuit in which the sum is to be formed of the currents entering in the subscriber's line and leaving the subscriber's line with equal weighting coefficients. First of all such an interface circuit will be described and subsequently it will be shown how the weighting circuits in accordance with the invention can be used in said interface circuit.

Figure 2:
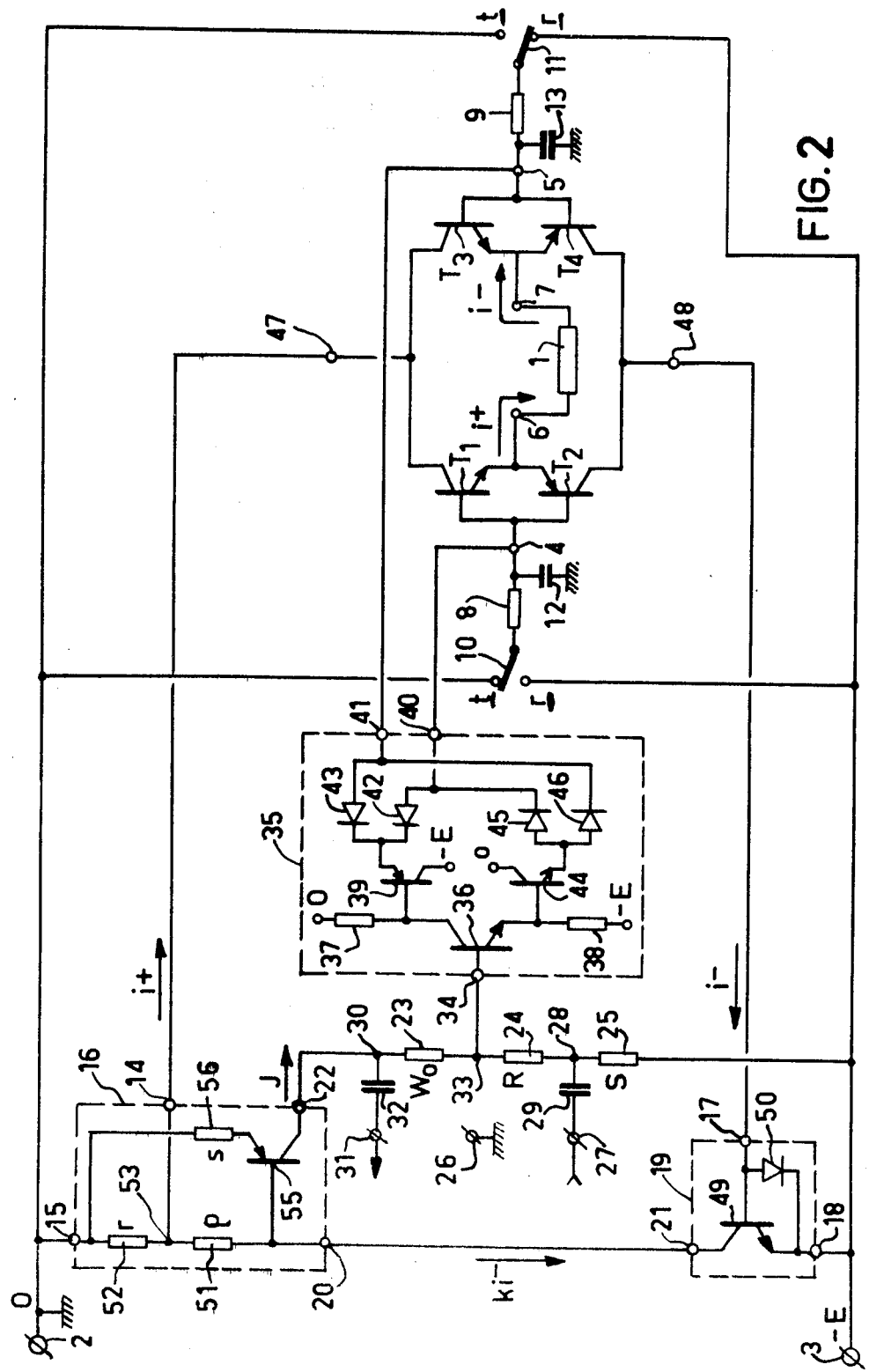
FIG. 2 represents a subscriber line interface circuit employing the circuit arrangement of FIG. 1 in order to form a weighted-sum current of the currents entering and leaving the subscriber's line.

The diagram of said interface circuit is shown in FIG. 2. One function of this interface circuit is to provide the d.c. power supply of a subscriber's line 1 by means of a d.c. power supply source, whose positive terminal 2 is at zero or earth potential and whose negative terminal 3 is at the potential $-E$ (for example $-48$ V).

Said interface circuit comprises a push-pull power amplifier constituted by two complementary transistor pairs ($T_1$, $T_2$) and ($T_3$, $T_4$). Each of said transistors may be a composite transistor in Darlington configuration.

The collectors of the npn transistors $T_1$ and $T_3$ are interconnected and connected to a power supply terminal 47 of the amplifier and the collectors of the pnp transistors $T_2$ and $T_4$ are interconnected and connected to the other power supply terminal 48 of the amplifier.

The bases of the transistors of each pair ($T_1$, $T_2$) and ($T_3$, $T_4$) are respectively connected to the input terminals 4 and 5 of the amplifier. Said input terminals 4 and 5 are connected to the power supply terminals 2 and 3 via the resistors 8 and 9 and the switching circuits 10 and 11, which are set to opposite positions t and r. Moreover, the two input terminals 4 and 5 are connected to earth via capacitors 12 and 13.

The emitters of the transistors ($T_1$, $T_2$) and ($T_3$, $T_4$) are also interconnected and connected to the respective output terminals 6 and 7 of the push-pull amplifier. Said output terminals 6 and 7 are connected to the two ends of the subscriber's line 1.

The power supply terminal 47 of the push-pull amplifier is connected to the positive terminal 2 of the power supply source, for example via the terminals 14 and 15 of the circuit 16 to be described hereinafter. The other power supply terminal 48 of the amplifier is connected to the negative terminal 3 of the power supply source via the terminals 17 and 18 of the circuit 19 to be described hereinafter. The circuits 16 and 19 are interconnected via their respective terminals 20 and 21 and, as will be explained hereinafter, cooperate with each other so as to form an embodiment of the device in accordance with the invention which generates the weighted-sum current of the currents entering and leaving the subscriber's line 1.

In the diagram of FIG. 2 it can be seen that there is provided a four-wire coupling to the exchange and said coupling is suitably obtained, as will be explained hereinafter, by applying the weighted-sum current J appearing on the terminal 22 of the circuit 16 to a network of three series-arranged resistors 23, 24, 25 connected to the power supply terminal 3. The four-wire connection of the interface circuit to the exchange is obtained as follows. The common point 28 of the resistors 24 and 25 is connected to the terminal 27 via the coupling capacitor 29, the signals from the exchange being applied to the input terminal 27 of the interface circuit and the terminal 26, which is connected to earth. The end 30 of the resistor 23 is connected to the terminal 31 via the coupling capacitor 32, the signal to be transmitted to the exchange being available between the output terminal 31 of the interface circuit and the terminal 26, which is connected to earth. The coupling capacitors 29 and 30 present a very low impedance to speech signals being transmitted.

Furthermore, the common point 33 of the resistors 23 and 24 is connected to the input 34 of a phase-shifting and switching circuit 35. Said circuit 35 comprises an npn transistor 36, whose base is connected to the input 34 and whose collector and emitter are connected to the respective one end of the resistors 37 and 38 of equal value whose respective other ends are at the potential O and $-E$ respectively of the power supply terminals 2 and 3. The collector of the transistor 36 is connected to the base of a pnp transistor 39, whose collector is at the power-supply potential $-E$ and shows emitter is connected to output terminals 40 and 41 of the circuit 35 via diodes 42 and 43, which are poled in the same direction as the base-emitter diode of said transistor 39. The emitter of the transistor 36 is connected to the base of an npn transistor 44, whose collector is at O potential and whose emitter is connected to the terminals 40 and 41 via diodes 45 and 46, which are poled in the same direction as the base-emitter diode of said transistor 44. The output terminals 40 and 41 of the circuit 35 are respectively connected to the input terminals 4 and 5 of the push-pull power amplifier.

In the absence of the circuit 35, that is to say, assuming that for example the connections between the terminals 40, 4 and 41, 5 are interrupted, the voltages applied to the input terminals 4 and 5 of the push-pull amplifier are O and $-E$ respectively when the switching circuits 10 and 11 are permanently set to the positions shown in the Figure. The transistors $T_1$ and $T_4$ are then conductive and the transistors $T_2$ and $T_3$ are cut-off. When ignoring the voltage drops across the base emitter diodes of the transistors $T_1$ and $T_4$, said voltages O and $-E$ will appear on the output terminals 6 and 7 of the push-pull amplifier in such a way that the subscriber's line 1 is energized with a voltage having an amplitude E, producing a direct current in said line from the terminal 6 to the terminal 7.

The operation of the phase-shifting and switching circuit 35, which is now assumed to be connected, will now be explained. The voltage across the two series resistors 24 and 25 is designated u, which voltage u is produced by the weighted sum current J and also by the speech signals from the exchange which are applied to the terminal 27. The voltage (relative to earth) applied to the input 34 of the circuit 35 is consequently $-E+u$. On the emitter of the transistor 36 the voltage $-E+u$ appears and on its collector the voltage $-u$. Via the base-emitter diode of the transistor 39, the diode 42 and the terminal 40 said voltage $-u$ is transferred to the input terminal 4 of the push-pull amplifier and via the base-emitter diode of the transistor 44, the diode 46 and the terminal 41, the voltage $-E+u$ is transferred to the input terminal 5 of the push-pull amplifier. Thus, by means of the circuit 35 two feedback voltages $-u$ and $+u$ are added to the voltage O and $-E$ appearing on the two input terminals 4 and 5 of the push-pull amplifier. Via the base-emitter diodes of the transistors $T_1$ and $T_4$ the voltages $-u$ and $-E+u$ appear on the output terminals 6 and 7 of the push-pull amplifier. The subscriber's line is now energized with a voltage having an amplitude $E-2u$, producing the direct current from the terminal 6 to the terminal 7.

If the switching circuits 10 and 11 are set to the positions which are the opposite of those shown in the Figure, the voltages on the input terminals 4 and 5 of the push-pull amplifier are respectively $-E$ and O in the absence of the circuit 35 and the direct current in the subscriber's line flows from the terminal 7 to the terminal 6. It is easy to see that with the circuit 35 the two feedback voltages $+u$ and $-u$ are applied to the two input terminals 4 and 5 of the push-pull amplifier and that the subscriber's line is energized with a voltage of an amplitude $E-2u$, which produces the direct current from the terminal 7 to the terminal 6.

The operation of the line interface circuit will now be described starting with the d.c. supply of the subscriber's line. For this only the d.c. components of the currents and voltages will be considered. In order to meet the specifications the interface circuit should, under normal conditions, behave as a transmission bridge having a resistance Ro which is equally divided over the two power supply terminals.

Since the interface circuit enables the voltage of the amplitude $E-2u$ to be applied to the subscriber's line, it behaves as a transmission bridge having an overall resistance $Ro=2u/i$, i being the loop current, which is of a transverse nature, which current is supplied to the subscriber's line by the interface circuit. The resistance presented to each of the two terminals of the power supply source is equal to half the resistance of the transmission bridge being $Ro/2=u/i$.

When the values of the resistors 24 and 25, through which the weighted-sum current J flows, are designated R and S, this yields:

$$u=(R+S)J$$

so that $$Ro=2(R+S)J/i \quad (4)$$

When $i^+$ is the current entering the subscriber's line (via terminal 6 in the figure) and $i^-$ is the current leaving the subscriber's line (via the terminal 7), the current J as a result of the weighted sum of the currents $i^+$ and $i^-$ with the respective weighting coefficients $\lambda^+$ and $\lambda^-$ is written as:

$$J=\lambda^+ i^+ + \lambda^- i^-$$

If the two weighting coefficients $\lambda^+$ and $\lambda^-$ have the same value $\lambda/2$, then $$J=\lambda/2(i^+ + i^-)$$

It is easy to appreciate that a weighted sum current J formed in this way depends only on the transverse current i supplied to the subscriber's line by the interface circuit and is independent of a longitudinal current $i_e$ which may be produced erroneously in the subscriber's line. In fact, the currents $i^+$ and $i^-$ may respectively be written as follows:

$$\begin{cases} i^+ = i + i_e \\ i^- = i - i_e \end{cases}$$

The sum $i^+ + i^- = 2i$ depends only on the transverse current i and is independent of the longitudinal current $i_e$.

The current J formed by the weighted sum of the currents $i^+$ and $i^-$ with the same weighting coefficient $\lambda/2$ may therefore be written:

$$J=\lambda i \quad (5)$$

For this value of J the overall resistance Ro of the transmission bridge to which the interface circuit is equivalent may be written as follows in accordance with formula (4):

$$Ro=2\lambda(R+S) \quad (6)$$

The resistance presented to each of the two terminals of the supply source is equal to half the transmission bridge resistance $Ro/2=\lambda(R+S)$. It should be noted that this is only true if the weighted sum current J is formed with the same weighting coefficients $\lambda/2$ for the currents $i^+$ and $i^-$. If this condition is fulfilled, formula (6) shows that by varying the coefficient $\lambda$ and/or the resistance R or S, the transmission bridge resistance Ro of the interface circuit can be adjusted while maintaining a perfect balance.

Now it will be explained how the speech signals are transmitted between the exchange and the subscriber's line, the four-wire connection to the exchange being obtained via the terminals 26, 27 and 31 and of the two-wire connection to the subscriber's line via terminals 6 and 7. In this explanation, the various quantities mentioned (voltages, currents, impedances etc.) relate only to the variable speech signals.

The first case to be considered is the transmission of speech signals from the exchange to the subscriber's line and it is assumed that no variable voltage is generated by the subscriber's station. It is assumed that the weighted-sum current J is always formed in the same way with the same weighting coefficient $\lambda/2$ for the currents entering and leaving the subscriber's line. This weighted-sum current J therefore always complies with $J=\lambda i$ and flows via resistors 23 and 24, the high-value capacitor 29, and the lowimpedance circuit of the exchange (not shown), which is included between the input terminal 27 of the interface circuit and the earth terminal 26. When $e_c$ is the voltage from the exchange, which is applied to the last-mentioned two terminals, u is the voltage applied to the input 34 of the phase shifter 35 and R is the value of the resistor 24, then:

$$u=e_c+\lambda Ri$$

Owing to the phase-shifting and switching circuit 35 the voltage $u_s$ obtained between the two terminals 6 and 7 of the subscriber's line is such that:

$$u_s=-2u.$$

If W is the impedance of the subscriber's line, this yields:

$$u_s = Wi$$

From these formulas it readily follows that $$u_s = -\frac{2W}{W + 2\lambda R} \cdot e_c$$

This last formula shows that for the speech signals the interface circuit behaves like an impedance Z, such that:

$$Z = 2\lambda R \tag{7}$$

This impedance Z is perfectly balanced relative to earth if the weighted-sum current J complies with $J = \lambda i$ and its value can be adjusted by varying the coefficient $\lambda$ and/or the resistance R, without affecting its balance relative to earth.

Specifically, if the impedance between the line and the interface circuit is matched, which is expressed by $W = 2\lambda R$, this yields $u_s = -e_c$. The full voltage $e_c$ applied to the four-wire input of the interface circuit appears on the terminals of the subscriber's line.

Moreover, for this direction of transmission, it should be examined whether the differential effect can be obtained, that is to say that no voltage must appear on the four-wire output of the interface circuit (between terminals 31 and 26) as a result of the voltage $e_c$.

If the value of the resistor 23 is $W_o$, the voltage $v_s$ on the four-wire output of the interface circuit may be written as:

$$v_s = u + \lambda W_o i$$

For the relevant direction of transmission it follows from the formulas already given that:

$$u = -\frac{Wi}{2}$$

$$i = -\frac{2e_c}{W + 2\lambda R}$$

It follows that the voltage $v_s$ for this direction of transmission may be written as:

$$v_s = \frac{2e_c}{W + 2\lambda R}\left(\frac{W}{2} - \lambda W_o\right)$$

This voltage is eliminated regardless of the value of the voltage $e_c$, and the differential effect is perfect if the resistance $W_o$, which may be called the balancing impedance, is such that:

$$W_o = W/2\lambda$$

The operation of the interface circuit will now be examined for the other transmission direction from the subscriber's line to the exchange. It is assumed that no voltage is applied from the exchange to the four-wire input of the interface circuit ($e_c = 0$) and that a voltage $v_a$ is generated in the subscriber's station. Using the notations already given, one may then write:

$$u = \lambda R i$$

$$-u = Wi + v_a$$

It follows that the current in the subscriber's line as a result of the voltage $v_a$ may be written thus:

$$i = \frac{v_a}{W + 2\lambda R}$$

This expression again shows that the junctor behaves like an impedance $Z = 2\lambda R$.

From this it is easy to deduce that for the present direction of transmission the voltage on the four-wire output of the interface circuit may be written as:

$$v_s = -\frac{\lambda(R + W_o)}{W + 2\lambda R} v_a$$

If the balancing impedance $W_o$ is chosen so as to obtain the differential effect and is consequently $W_o = W/2\lambda$ this confirms that $v_s = -v_a/2$. The four-wire output of the interface circuit therefore receives half the voltage $v_a$ generated in the subscriber's station, which corresponds to a transmission without losses.

Finally, between the two-wire connection of the interface circuit to the subscriber's line and the four-wire connection to the exchange a transmission without losses ($u_s = -e_c$, $v_s = -v_a/2$) and a perfect differential effect are obtained by choosing the values of $\lambda$ and R in such a way that:

$$W = 2\lambda R$$

$$W_o = \frac{W}{2\lambda}$$

In a subscriber line interface circuit of the type just described it is important that the weighted sum current J of the current $i^+$ entering the subscriber's line and of the current $i^-$ leaving the subscriber's line is formed with weighting coefficients $\lambda^+$ and $\lambda^-$ of equal value $\lambda/2$. In this way, the resistance $R_o$ of the transmission bridge to which the interface circuit is equivalent satisfies $R_o = 2\lambda(R + S)$ and remains balanced relative to the terminals of the supply source regardless of the values selected for $\lambda$, R and S, in order to obtain a particular value of $R_o$. Similarly, the impedance Z which the interface circuit presents to speech signals complies with $Z = 2\lambda R$ and remains perfectly balanced relative to earth, regardless of the values selected for $\lambda$ and R in order to obtain a particular value of Z. Moreover, it is obviously very useful that in this interface circuit the common value $\lambda/2$ of the two weighting coefficients $\lambda^+$ and $\lambda^-$ is adjustable.

A device for the formation of the weighted-sum current J can be obtained by combining the circuits 16 and 19, which each are constructed as the interface circuit whose diagram is shown in FIG. 2. Whatever the direction of the direct current in the subscriber's line, a current is obtained at the terminal 14 of the circuit 16 which always flows in the same direction and which is practically equal to the current $i^+$ entering the subscriber's line, similarly at the terminal 17 of the circuit 16 a current is obtained which always flows in the same direction and which is practically equal to the current $i^-$ leaving the subscriber's line.

The circuit 19 is a known current mirror circuit which comprises an input terminal 17 at which the current $i^-$ appears, a power supply terminal 18 which is connected to the negative terminal 3 of the power supply source and an output terminal 21. In the example shown, the current mirror 19 comprises an npn transistor 49 and a diode 50, connected to terminals 17, 18 and 21 as shown in the Figure. At its output terminal 21 this current mirror produces a current $ki^-$ proportional to the current $i^-$ at its input terminal 17, the coefficient k in the present example depending only on the geometric characteristics of the transistor 49 and of the diode 50, if these are integrated on the same semiconductor body.

The circuit 16 comprises an input terminal 14 on which the current $i^+$ appears, a further input terminal 20 on which the current $ki^-$ supplied by the current mirror circuit 19 appears a power supply terminal 15, connected to the positive terminal 2 of the power supply source, and an output terminal 21 on which the weighted sum current J appears. Between the terminal 20 and the terminal 15 two resistors 51 and 52 in series are included, respectively having the values $p_1$ and $r_1$. The input terminal 14 is connected to the terminal 53 which interconnects the resistors 51 and 52. The other input terminal 20 is connected to the base of the pnp transistor 55, whose collector is connected to the output terminal 22 and whose emitter is connected to the power supply terminal 15 via the resistor 56 of the value s.

The operation of said circuit 16 may be described as follows: the voltage v between the base of the transistor 55 and the power-supply terminal 15 may be written as:

$$v = r_1 i^{30} + (r_1 + p_1) k i^-$$

If the two resistance values $r_1$ and $p_1$ are adjusted so that:

$$\frac{r_1}{r_1 + p_1} = k$$

the voltage v may be written as follows:

$$v = r_1 (i^+ + i^-)$$

Transistor 55 is arranged as a voltage follower across whose emitter resistor 56 the voltage v applied to its base minus the voltage across its base-emitter diode is available. If said base-emitter diode voltage and the base current of the transistor 55 are ignored, the collector current of the transistor 55, that is the output current J of the circuit 16, may be written as J=v/s or:

$$J = \frac{r_1}{s} (i^+ + i^-)$$

Thus, in the weighted-sum current J, the currents $i^+$ and $i^-$ are weighted with the same weighting coefficient $r_1/s$, said common weighting coefficient being adjustable by adjusting the value s of the variable resistor 56, without impairing the equality of the weighting coefficients, which is obtained by satisfying the requirement $$\frac{r_1}{r_1 + p_1} = k$$

The two circuits 16 and 19 in accordance with FIG. 2 and combined as described, however, give rise to certain problems in the interface circuit. Thus, in the current mirror circuit 19 shown the weighting coefficient k depends to a certain extent on the voltage drop across the diode 50 and the base-emitter diode of the transistor 49 and consequently depends on the input current $i^-$. This means that the requirement $$\frac{r_1}{r_1 + p_1} = k$$

to be met in order to obtain equality of the weighting coefficients, depends on the current in the subscriber's line. Therefore it would also be interesting if the weighting coefficient k were adjustable. On the other hand, in the circuit 19 shown, the formula $$J = \frac{r_1}{s} (i^+ + i^-)$$

defining the weighted-sum current, is only valid, when ignoring the base-emitter diode voltage of the transistor 55. In fact this diode voltage cannot be ignored and varies with the current J, that is, with the current in the subscriber's line.

The circuits in accordance with the invention 16 and 19, shown in FIG. 1, do not have these drawbacks, as has been demonstrated in the foregoing and it is particularly advantageous to employ the combination of the two circuits 16 and 19 in accordance with the invention, as shown in FIG. 1, in the subscriber line interface circuit shown in FIG. 2. In said interface circuit it is alternatively possible to combine a known current mirror circuit, such as that shown in FIG. 2, with the circuit 19 in accordance with the invention shown in FIG. 1 and alternatively it is possible to combine a circuit 19 as shown in FIG. 2 with the current mirror circuit in accordance with the invention shown in FIG. 1.

It is now assumed that in the interface circuit the combination of the circuits 16 and 19 shown in FIG. 1 is used in such a way that, in accordance with formula (3) the weighted-sum current is $J = r/s (i^+ + i^-)$. By introducing the transverse current i supplied by the interface circuit the current J may also be written as $J = \lambda i$, the current $\lambda$ being represented by the expression:

$$\lambda = 2r/q \qquad (8)$$

In accordance with formulas (6) and (7) the transmission bridge resistance $R_o$ of the interface circuit and the impedance Z of the interface circuit for speech currents can be adjusted by modifying the coefficient $\lambda$. With the means used in accordance with the invention for forming the weighted-sum current $J = \lambda i$, it is very simple to obtain different and separately adjustable values of $\lambda$ for the direct current and for the variable speech currents so that the resistance $R_o$ and the impedance Z can be adjusted independently.

Figure 3:
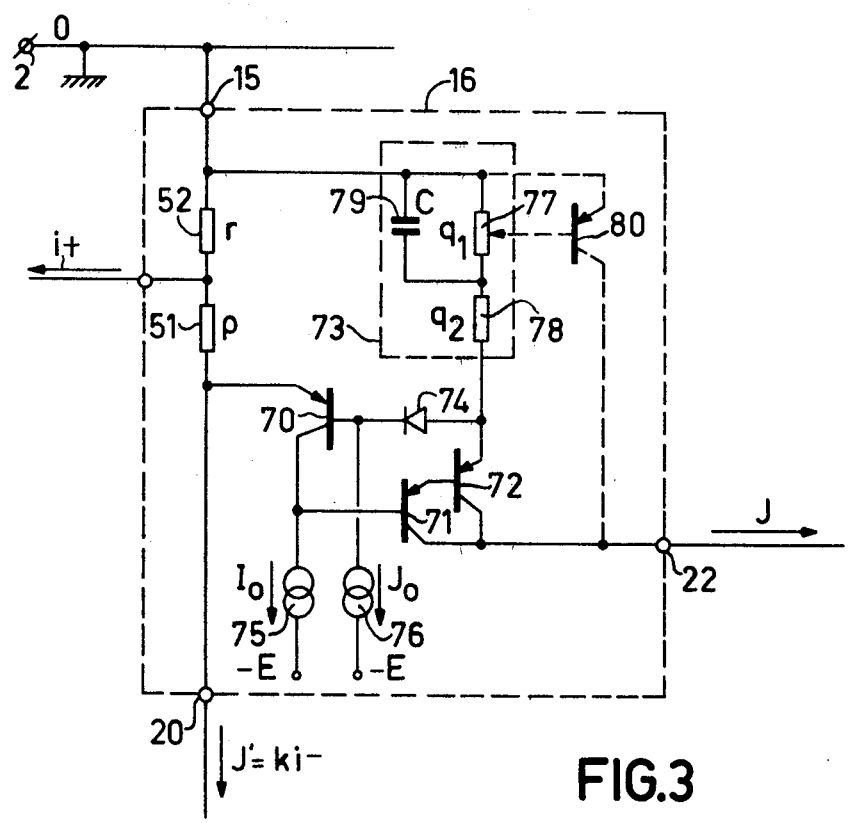
FIG. 3 shows a weighting circuit in accordance with the invention, in an embodiment which is suitable for a subscriber line interface circuit and which enables the current in the subscriber's line to be reduced in the case of an erroneous call and to be limited in the case of a short line.

This result can be obtained by modifying the circuit 16 as indicated in FIG. 3. This modified circuit 16 comprises all the elements of the corresponding circuit in FIG. 1, but the impedance 73 is realised as follows. It is constituted by two series-connected resistors 77 and 78, of the respective values $q_1$ and $q_2$, the resistor 77 being shunted by a capacitor 79 having a high capacitance C, which practically constitutes a short-circuit for the variable speech currents. Applying formula (8), it can be seen that the coefficient $\lambda$ takes the value $$\frac{2r}{q_1 + q_2}$$

for direct current and the value $2r/q_2$ for variable speech currents. The values of $R_o$ and $Z$ given by formulas (6) and (7) may consequently be written as:

$$R_o = \frac{4r}{q_1 + q_2}(R + S) \quad (9)$$

$$Z = \frac{4r}{q_2} R \quad (10)$$

These two formulas clearly show that, if the resistance $q_2$ is adjusted to obtain the desired impedance value Z for speech currents, the resistance $q_1$ may be varied in order to obtain the desired value for the transmission bridge resistance Ro.

This possibility may be used for simply realising a function which is generally required in an interface circuit. This function consists in increasing the transmission bridge resistance $R_o$ in order to reduce the loop current when the exchange has detected an erroneous call, for example when the subscriber's receiver is inadvertently unhooked for a prolonged time. In response to a command from the exchange the resistance $q_1$ may then be switched from its normal value to a much lower value corresponding to a much higher value of $R_o$.

Moreover, by adding a transistor 80, represented by a broken line to the circuit 16 shown in FIG. 3 the loop current can be limited to a given value in the case of a very short line. This transistor 80 of the pnp type has its emitter connected to the positive supply terminal 2 and its collector to the output terminal 22 of circuit 16 while the resistor 77 is replaced by a potentiometer, whose wiper is connected to the base of the transistor 80. As long as the voltage between the base and the emitter of transistor 80 is smaller than the threshold voltage (of the order of 0.6 V), transistor 80 does not conduct and the interface circuit behaves as explained in the foregoing; in particular, the loop current is limited by the transmission bridge resistance Ro of the interface circuit given by formula (9). As already explained, it is equally possible to say that the loop current i results from applying the voltage E−2u to the subscriber's line, u being the voltage drop produced by the current J=λi through the two series resistors 24 and 25 of the value R and S. Beyond a certain value of the loop current i, the current J=λi through the resistor 77 produces such a voltage between the base and the emitter of transistor 80 that this transistor is turned on. The current supplied by transistor 80 tends to cause an increase in the voltage drop u, a decrease in the voltage E−2u applied to the subscriber's line and, therefore, a decrease in the loop current i. Finally, when the subscriber's line becomes too short, the loop current is stabilized at a value $i_o$ which can be adjusted by means of the wiper of potentiometer 77. This adjustment does not in any way affect the characteristics of the interface circuits for lines of normal lengths.

Everything which has just been described and explained with regard to the circuit 16 of FIG. 3 also applies to the circuit 16 in accordance with FIG. 2. It suffices to change the resistor 56 of the value s in the same way as the resistor 73 of the value q.

What is claimed is:

1. A circuit for weighting an input current with a specific coefficient comprising a first transistor whose emitter is coupled to a power supply terminal via a first resistor, of which one end is connected to the input terminal of said circuit and of which the other end is connected to said power supply terminal, the collector of said first transistor being energized by a current source and its base being connected to a current source and to a diode which is connected to the emitter of a single or composite second transistor, whose emitter is connected to said power supply terminal via a second resistor, whose base is connected to the collector of said first transistor, and whose collector is connected to the output terminal of said circuit, the weighting coefficient of the input current being determined by the ratio between the values of the first and the second resistors.

2. A circuit for weighting a plurality of input currents with specific coefficients and for forming the sum of said weighted input currents comprising a first transistor, whose emitter is coupled to a power supply terminal via first resistors connected in series, one end of each of said resistors being connected to an input terminal receiving an input current, whose collector is energized by a current source, and whose base is connected to a current source and to a diode connected to the emitter of a single or composite second transistor, whose emitter is connected to said power supply terminal via a second resistor, whose base is connected to the collector of the first transistor, and whose collector is connected to the output terminal of said circuit, the weighting coefficients of the input currents each being determined by the ratio between the values of the first resistors present between one input terminal and the power supply terminal and the value of the second resistor.

3. A circuit arrangement for forming the sum of a first current and a second current which are weighted with the same coefficient, comprising a first circuit for weighting said first current with a specific coefficient k to provide a weighted first current, a second circuit for weighting a second current to form a weighted second current and for forming the sum of said first weighted current and said second weighted current, said second circuit comprising a first input terminal connected to said first circuit for receiving said weighted first current, a second input terminal for receiving said second current, a first transistor and two first resistors, the emitter of said first transistor being coupled to a power supply terminal via said first resistors connected in series, the emitter of said first transistor being connected to said first input terminal and the common point of said first resistors being connected to said second input terminal, a diode, a second transistor and a second resistor, the base of said first transistor being connected via said diode to the emitter of said second transistor, the emitter of said second transistor being connected to said power supply terminal via said second resistor, the base of said second transistor being connected to the collector of said first transistor, and the collector of said second transistor being connected to the output terminal of said second circuit, the ratio between the value of said first resistor which is connected to the power supply terminal and the sum of the values of said two first resistors being adjusted so as to be equal to said coefficient k, the sum of said weighted currents being further weighted by a weighting coefficient which is determined by the ratio between the value of said first resistor which is connected to the power supply terminal and the value of said second resistor.

4. A circuit arrangement as claimed in claim 3 wherein said first circuit comprises a current mirror having an input terminal and an output terminal, a third transistor and a second diode, the base of said third transistor being connected to the input terminal of said current mirror, the collector of said third transistor being connected to the output terminal of said current mirror, the emitter of said third transistor being connected to a second power supply terminal and said second diode being connected in parallel with the base emitter junction of said third transistor.

5. The circuit arrangement as claimed in claim 3 wherein said first circuit comprises a third transistor whose emitter is coupled to a second power supply terminal via a third resistor, one end of which is connected to the input terminal of said circuit and the other end of which is connected to said second power supply terminal, the collector of said third transistor being energized by a current source and its base being connected to a current source and to a second diode which is connected to the emitter of a fourth transistor whose emitter is connected to said second power supply terminal via a fourth resistor, whose base is connected to the collector of said third transistor, and whose collector is connected to the output terminal of said second circuit, the weighting coefficient of said first current being determined by the ratio between the values of said third and fourth resistors.

6. A circuit arrangement for forming the weighted sum of a first current and a second current comprising a first input terminal for receiving said first current, a second input terminal for receiving said second current, a first transistor, the emitter of said first transistor being coupled to a power supply terminal via two first resistors connected in series, the emitter of said first transistor being connected to said first input terminal and the common point of said first resistors being connected to a second input terminal, the collector of said first transistor being energized by a current source, the base of said first transistor being connected to a current source and to a diode connected to the emitter of a second transistor, the emitter of said second transistor being connected to said power supply terminal via a second resistor, the base of said second transistor being connected to the collector of said first transistor, and the collector of said second transistor being connected to the output terminal of said circuit arrangement, the weighting coefficient of said first current being determined by the ratio between the value of the first resistor which is connected to the power supply terminal and the value of said second resistor, and the weighting coefficient of said second current being determined by the ratio between the value of the first resistor which is connected to the power supply terminal and the sum of the values of said two first resistors and also by the ratio of the value of said first resistor which is connected to the power supply terminal and the value of said second resistor.

7. The circuit arrangement as claimed in claim 6 wherein said second resistor connected to said power supply comprises a potentiometer having a wiper contact, and further comprising a third transistor whose emitter is connected to said power supply terminal, whose collector is connected to said output terminal, and whose base is connected to the wiper contact in the potentiometer.

8. A circuit arrangement for forming the weighted sum of a first current and a second current, each of said currents having direct current and speech current components, comprising a first input terminal for receiving said first current, a second input terminal for receiving said second current, a first transistor, the emitter of said first transistor being coupled to a power supply terminal via two first resistors connected in series, the emitter of said first transistor being connected to said first input terminal and the common point of said first resistors being connected to a second input terminal, the collector of said first transistor being energized by a current source, the base of said first transistor being connected to a current source and to a diode connected to the emitter of a second transistor, the emitter of said second transistor being connected to said power supply terminal via two second resistors connected in series and a capacitor connected between the common point of said second resistors and said power supply terminal, the base of said second transistor being connected to the collector of said first transistor, and the collector of said second transistor being connected to the output terminal of said circuit arrangement, the weighting coefficient for the direct current components of said first current being determined by the ratio between the value of the first resistor which is connected to the power supply terminal and the sum of the values of said second resistors, and the weighting coefficient for the direct current component of said second current being determined by the ratio between the value of the first resistor which is connected to the power supply terminal and the sum of the values of said two first resistors and also by the ratio of the value of said first resistor which is connected to the power supply terminal and the sum of the values of said second resistors and the weighting coefficient for the voice current component of said first current being determined by the ratio between the value of the first resistor which is connected to the power supply terminal and the value of the second resistor connected to said second transistor, and the weighting coefficient for the voice current component of said current being determined by the ratio between the value of the first resistor which is connected to the power supply terminal and the sum of the values of said first two resistors and also by the ratio of the value of the first resistor which is connected the the power supply terminal and the value of the second resistor which is connected to said second transistor.

* * * * *